United States Patent [19]

Dueck

[11] 4,089,355
[45] May 16, 1978

[54] AUTOMATIC RESAW SHAKE CUTTER AND METHOD

[76] Inventor: Gerhard G. Dueck, Suite 306-1635 West 12th, Vancouver, B.C., Canada

[21] Appl. No.: 784,241

[22] Filed: Apr. 4, 1977

[51] Int. Cl.² .................. B27M 1/08; B27M 3/02; B27C 1/00
[52] U.S. Cl. ........................ 144/309 R; 83/4; 83/418; 83/436; 144/13; 144/323
[58] Field of Search .............. 144/13, 309 R, 323; 83/4, 418, 436, 920

[56] References Cited

U.S. PATENT DOCUMENTS

| 3,171,450 | 3/1965 | Boullet | 144/13 X |
| 3,554,250 | 1/1971 | Ulsky | 144/323 |

Primary Examiner—Travis S. McGehee
Attorney, Agent, or Firm—Seed, Berry, Vernon & Baynham

[57] ABSTRACT

A plurality of rows of vertically spaced discs are located on opposite sides of the path of movement of a shake blank as it is pushed along a cutting plane into the path of a bandsaw blade. The discs on each side of the cutting plane have respective radii either uniformly progressively increasing for a portion of their perimeters or uniformly progressively decreasing for a portion of their perimeters so that as the discs rotate they engage opposite side faces of the blank, advancing the blank in the cutting path and simultaneously skew the rearward end of the shake laterally of the cutting plane so that the shake blank is cut along a diagonal. The framework supporting all of the discs can be moved to simultaneously shift all discs laterally to accommodate cutting characteristics of a particular saw blade. Initial positioning of the forward end and final positioning of the rearward end of the blank for overly thick blanks is obtained by cam surfaces on the two rows of discs closest upstream of the blade. The blank is positioned at its forward end so that its side surface is generally in alignment with the cutting plane and as the blade is nearing the rearward edge of the blank the opposite side face of the blank is moved positively into the cutting plane.

23 Claims, 14 Drawing Figures

AUTOMATIC RESAW SHAKE CUTTER AND METHOD

BACKGROUND OF THE INVENTION

1. Field of the Invention

This invention pertains to method and apparatuses for resawing shake blanks into a pair of tapered shakes each with a sawn surface and an opposite naturally-split surface.

2. Description of the Prior Art

A typical shake is anywhere from 4 to 14 inches or more in width and from about 18 to 24 inches long with thickness ranges from one-half to ¾ inch and ¾ to 1¼ inch at the butt tapering to ⅛ inch or thinner at the tip. Other thicknesses and lengths are also possible. The most commonly accepted practice for producing these shakes is to split a blank or board of the desired thickness from a shake block then pass the board through a thin bandsaw to form two shakes, each with a split face and a sawn back. Generally, the sawing is accomplished by sawyers who manually guide the board diagonally through the saw to produce the thin tips and thick butts.

Many attempts have been made to mechanize the resaw process to eliminate the hazards of manual resawing, to increase production, provide more uniformity in the taper of the shakes, and increase yield. Generally, these machines have not been successful since the irregularities of a split piece of wood has defied uniformly good final shakes. One such machine is shown in U.S. Pat. No. 3,554,250 which passes a board endwise between two rollers while shifting the rollers laterally of a cutting plane to produce a cut which attempts to approximate a diagonal cut through the board. This type of machine, however, is not able to hold the board stable while cutting, cannot adequately compensate for curved or twisted boards and does not adequately compensate for boards which may not be of a uniform thickness throughout.

SUMMARY OF THE INVENTION

It is an object of this invention to provide a shake resawing apparatus which can be adjusted to compensate for the cutting characteristics of a particular bandsaw blade.

It is another object of this invention to provide a method for reasawing shakes accurately along the diagonal of a shake board.

It is another object of this invention to provide methods and apparatuses for increasing the yield, that is, producing the two thickest butts possible, from a shake board.

It is still another object of this invention to provide method and apparatus for advancing while simultaneously skewing a shake board as it is passed through a bandshaw blade.

Basically, the first feature of the invention is obtained by mounting a plurality of board-advancing and shifting discs on a framework which can be moved relative to the location of the bandshaw blade so that the initial position of the shake board as it is fed to the bandshaw blade can be moved generally laterally for start-up adjustments and secondly to accommodate the cutting characteristics of a particular blade. In this latter respect, it is known that bandsaw blades, due to the initial manufacture of the teeth or subsequent refiling of the teeth, tend to have a different cutting pattern than another blade and therefore one blade will pass through a shake board along a different cutting path than will a second blade. With this invention it is possible with a simple adjustment to make a first cutting pass with the blade and establish its cutting pattern and then shift all of the means for moving the board past the blade to bring the cutting path back to the desired location in subsequent shake boards. Thus this invention is extremely significant in increasing yield of thick butt shakes from a board. Since the shake producing mill is paid a premium for thick shake butts over those with thinner butts, the provision of a simple technique to correct for the cutting characteristics of a particular saw blade can produce a considerably higher income from the sale of the shake. This is further benefitted due to the fact that the normal usage of a bandsaw blade between resharpenings is two to three hours. Thus in a one shift or double shift mill operation, the blade may require changing from eight to ten times.

A second feature of importance in the invention is the use of a pair or set of opposed discs each disc having a radius over at least a portion of its perimeter which diminishes or increases uniformly progressively. With two opposed discs confronting one another, a shake board passed between will, when engaged by the increasing diameter of one disc and the decreasing diameter of the other disc, be shifted laterally uniformly as the discs advance the board along the cutting plane. The shift is thus self-regulating and does not require complicated timing mechanisms. The shifting technique can be used for example in the U.S. Pat. No. 3,554,250 to great advantage and thus is not limited to a specific use of the technique in applicant's invention.

Still a further important feature of the invention is to use the aforementioned increasing and decreasing radii concept for a unique mold and apparatus by which a board is not only advanced but in addition has its rear end skewed relative to the forward end (or vice versa) so that the blade cuts along a plane which closely approximates the diagonal of the board. Initial placement of the forward end of the board in initiation of the cut is automatically adjusted to obtain the maximum thickness for a particular range of board thicknesses. This is accomplished by aligning one side of the board at its forward end with the cutting blade regardless of the thickness of the board at the forward end. Likewise, the board has its rearward end also laterally adjusted to obtain the maximum butt thickness as the blade leaves the board. In the preferred embodiment of the invention, a plurality of rows of a plurality of vertically spaced discs are arranged on either side of the cutting plane and the discs are spring biased toward the cutting plane. Thus an oncoming shake is pressed between the opposed sets of discs for advancing and skewing the board. Provision is also made for accommodating twist or warpage or other irregular curvatures in a board caused by a natural deformation in the wood grain from which the block was split. This is accomplished in the preferred embodiment by allowing the rows of discs to shift or tilt toward and away from the cutting plane. With this improved method and apparatus a shake board is fed incrementally between successive opposed sets of discs and, at the set of discs adjacent the upstream end of the cutting blade, is initially positioned with its forward end shifted laterally so that the blade enters at the desired distance from the side face of the board to obtain the maximum butt thickness. As the forward end of the board reaches the blade, however, the rearward end of the board has been skewed laterally so that the blade enters generally along the diagonal of the board.

DETAILED DESCRIPTION OF THE PREFERRED EMBODIMENTS

For purposes of this description we will describe the ideal board BD (FIG. 5) as being 24 inches in length and one inch thick for ease of simple arithmetical calculations. It is understood that the apparatus and method are applicable, of course, to other board and shake sizes. Thus ideally the butt or weather end of the shake will have a thickness T of 1 inch and the thin end will have a thickness tapering to zero or some desirable minimum thickness t. The board when cut will then produce two shakes S1 and S2 being generally the mirror image of each other. The board will have a forward end FE and a rearward end RE. The board will also have opposite sides L and R which will be irregular following the natural grain pattern of the wood from which the block was split.

Figure 1:
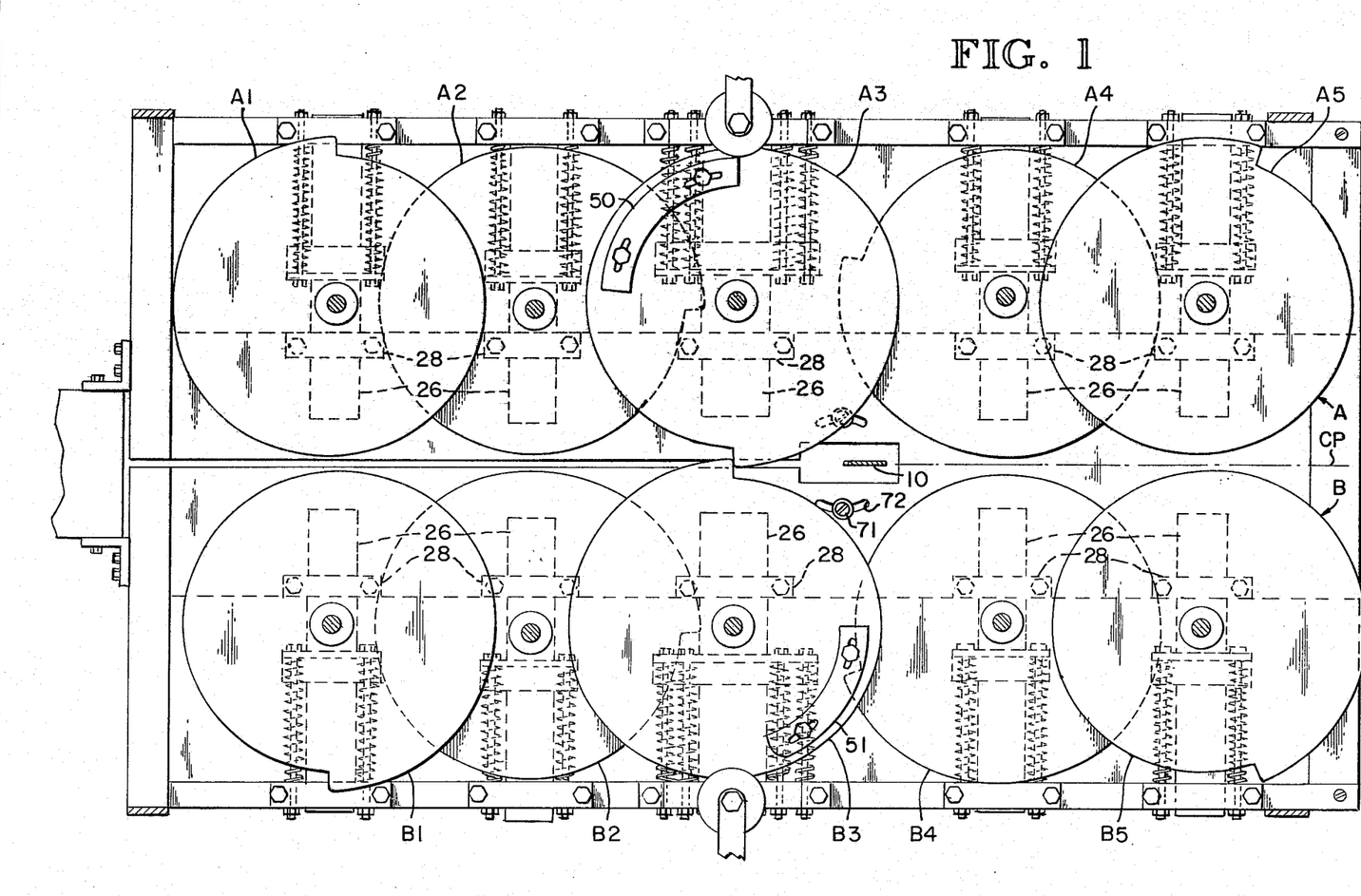
FIG. 1 is a horizontal section of a resaw apparatus embodying the principles of the invention and useful in practicing the method of the invention.
Figure 2:
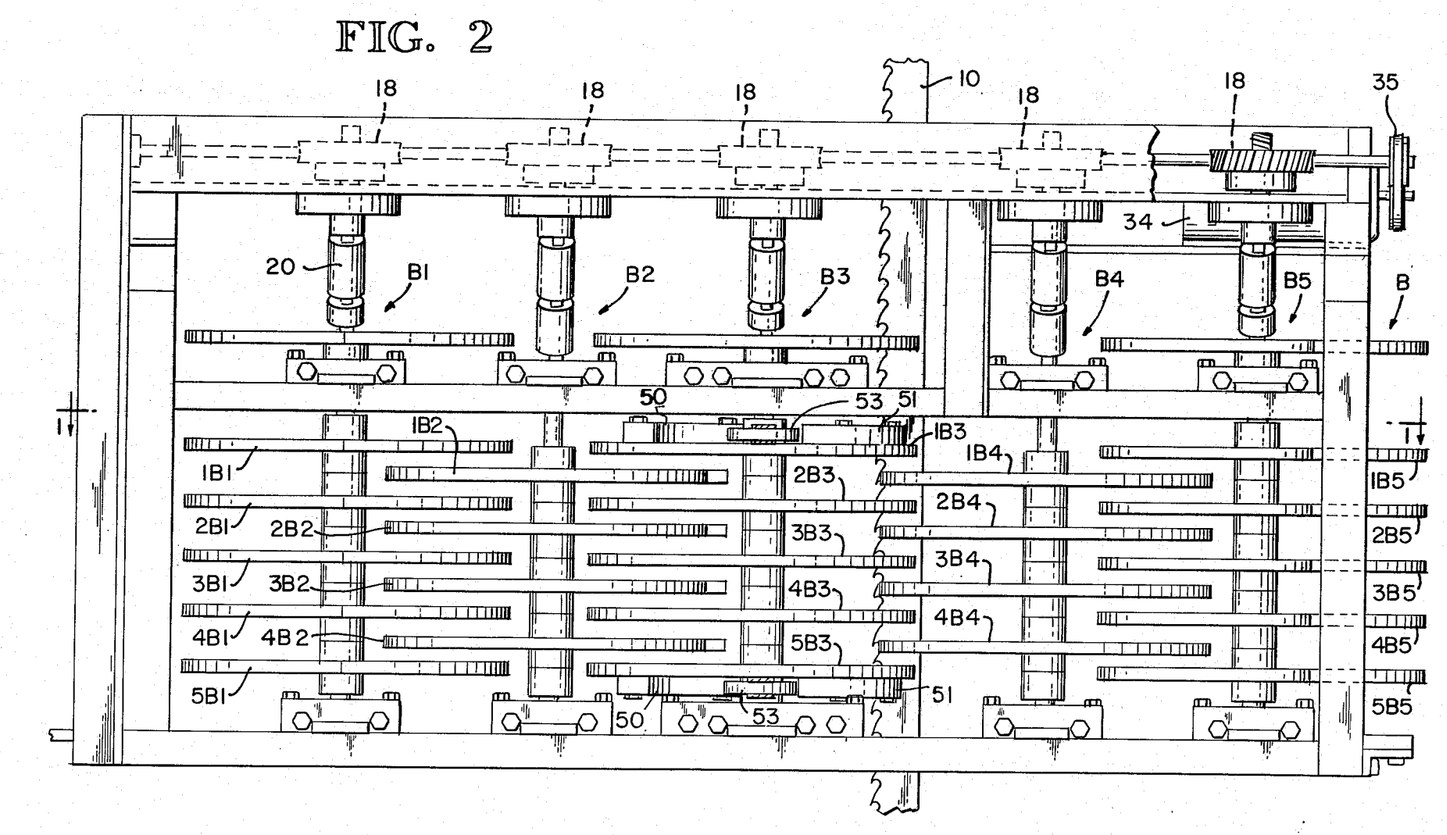
FIG. 2 is a side elevation of the apparatus shown in FIG. 1.
Figure 3:
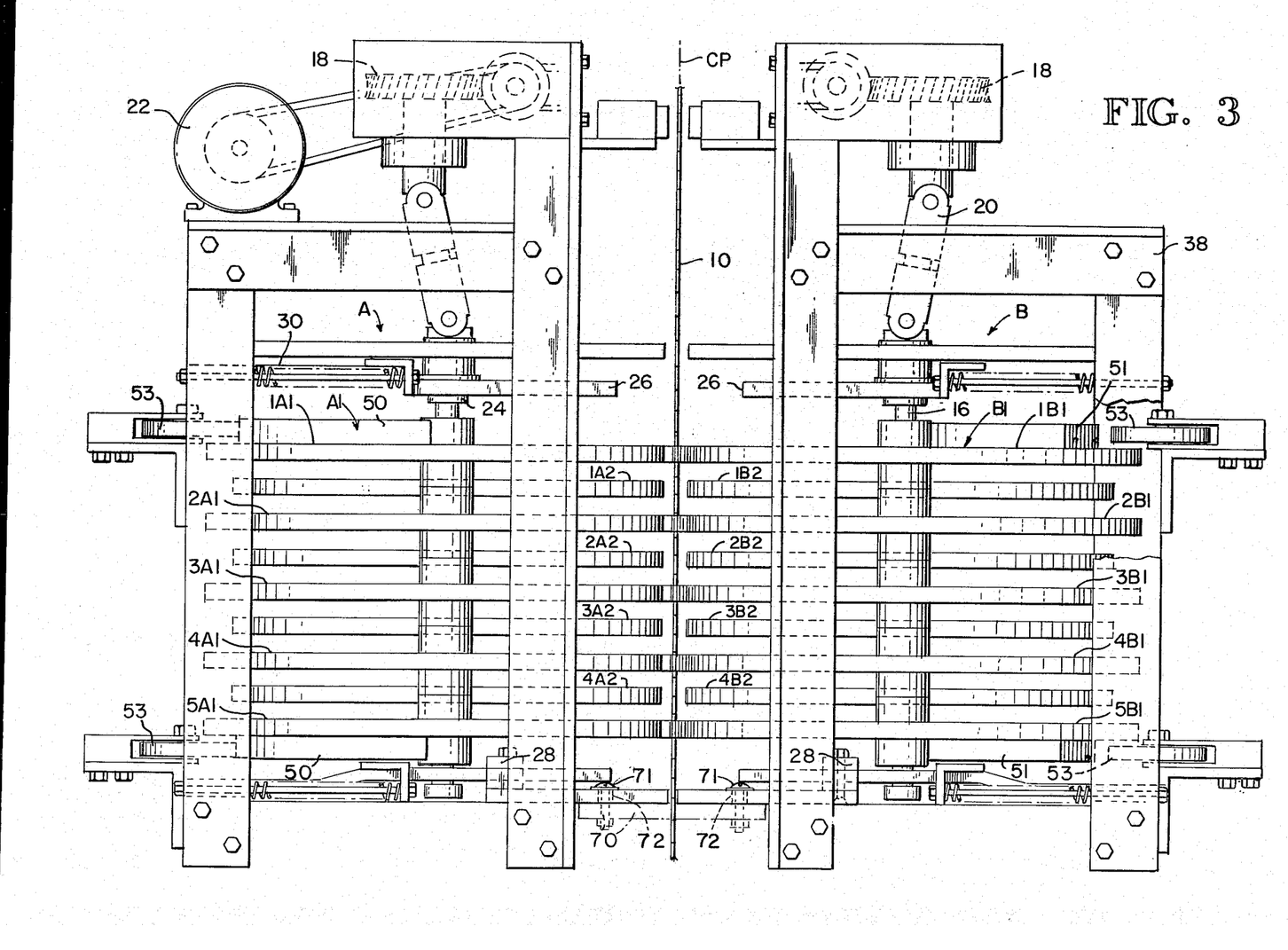
FIG. 3 is an end elevation looking in the direction of the cutting edge of the saw blade of the apparatus shown in FIG. 1.
Figures 4, 5:
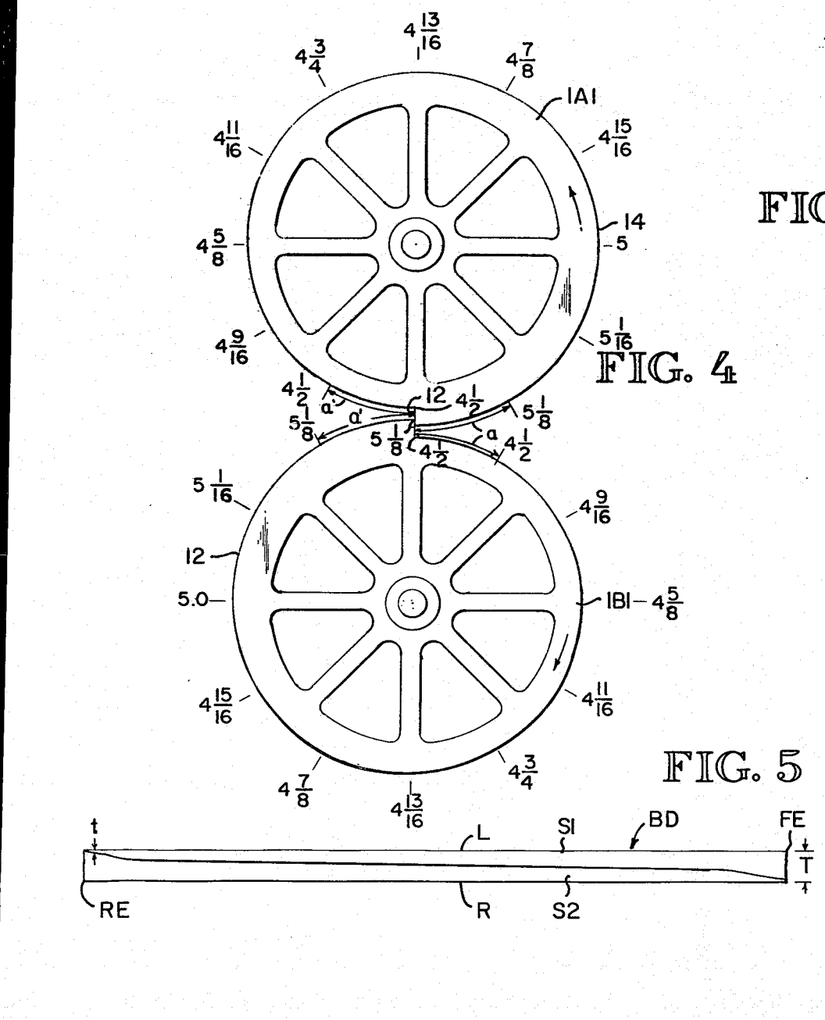
FIG. 4 are fragmentary plans of two discs employed in the apparatus of FIG. 1 showing their respective decreasing and increasing radii portions.
FIG. 5 is a schematic illustration of a typical cutting path through a shake board following the principles of the invention.

The shake resawing apparatus includes a plurality of rows A and B of vertically spaced discs with the rows being arranged sequentially on opposite sides of a cutting plane CP running through the saw blade 10. Each A row of discs is designated with the reference character A1, A2, A3, A4 and A5 with the B rows of discs being designated by the characters B1, B2, B3, B4 and B5. Each disc in a particular row starting from the uppermost disc will be given the designation 1 preceding the character A1, for example. Thus, as shown in FIG. 3, a row of discs 1A1–5A1 are shown on the left-hand side of the machine and behind that row of discs are shown a second row of discs 1A2—4A2 and then on the right side of the cutting plane CP is shown a forward set of discs 1B1–5B1 and behind that row of discs is shown the second row of discs 1B2–4B2. The A2, B2, A4, B4 rows of discs have only 4 discs in a row whereas row A1, B1, A3, B3, A5, B5 have 5 discs in a row. A typical set of opposed discs for example 1A1 and 1B1 are shown in FIG. 4. Each disc has a notch 12 and a periphery 14. In the case of the disc 1A1, the first $2\frac{1}{2}(a)$ inches and the last $2\frac{1}{2}$ inches $(a')$ of the periphery are of a constant radius. The notch 12 on A discs provide a positive pushing surface to clear any undersized boards out of the machine. Starting from point $a$, however, the radius of the periphery progressively uniformly diminishes until it reaches its smallest constant radius $(a')$ adjacent the notch 12. On disc 1B1 the notch 12 also starts at a periphery with a constant radius of about $2\frac{1}{2}$ inches $(a)$ and then the radius of the periphery is uniformly progressively increased until it reaches its maximum at a second constant radius at $2\frac{1}{2}$ inches from the notch 12$(a')$. The discs are otherwise identical in shape and are spaced from one another about 158 inch. In the preferred form of the invention the discs are in the form of spoked wheels for reducing weight and providing a self-cleaning action.

The discs are mounted on rotary shafts 16 each of which are driven by a common drive worm 18 through universal joint connections 20 that allow for movement of the shafts laterally of the cutting plane CP. The common worm drive 18 is powered by a motor 22 or can be connected to the bandsaw motor. The shafts are mounted in bearing blocks 24 which are mounted in slides 26. The slides are slidably mounted in brackets 28 allowing the shafts 16 to be reciprocated toward and away from the cutting plane CP. Springs 30 urge the slides and thus the shafts 16 toward the cutting plane so that the discs are spaced $\frac{5}{8}$ inch from one another along a vertical plane through the shafts as shown in FIG. 1. Springs 30, brackets 24, and slides 26 are also provided at the lower ends of the shafts 16 so that the shafts can be moved in an upright position toward and away from the cutting plane or alternatively the top or lower end of each shaft can move toward or away from the cutting plane a greater distance than the opposite end of the shaft.

The common drive 18 rotates all shafts 16 simultaneously and at the same speed. Furthermore, the drive is adjustable so the board feeding speed of the discs can be varied as the cutting speed is slowed down as a blade becomes dulled during use. For example, a typical bandsaw blade may travel over a 36-inch diameter band wheel at a rate of about 900 rpm. This converts to a blade speed of about 140 feet per second. The common drive 18 in this invention is also preferably coupled to the conventional bandsaw drive 34 in any conventional manner as indicated by the line 35 so that the bandsaw blade drive and disc drive are coordinated. In this manner, as the cutting blade dulls and slows down as it cuts this slow down in cutting speed and speed of the saw will also appear as a slow down in the feeding speed of the board.

The discs are supported in a main frame 38 that rests on a bandsaw table 70. The frame is secured to the bandsaw table by bolts 71 that slide in slots 72. By loosening the bolts 71 the entire frame 38 can be shifted by initially aligning the cutting plane CP and for subsequent adjustments for new or resharpened blades. The saw blade after being refiled and having a new cutting characteristic is passed through one of the boards until its cutting characteristic or cutting path is established and then the shift of the frame 38 and thus all of the shafts 16 is made so that the next cut by the saw follows the desired pattern through the board.

Figure 6:
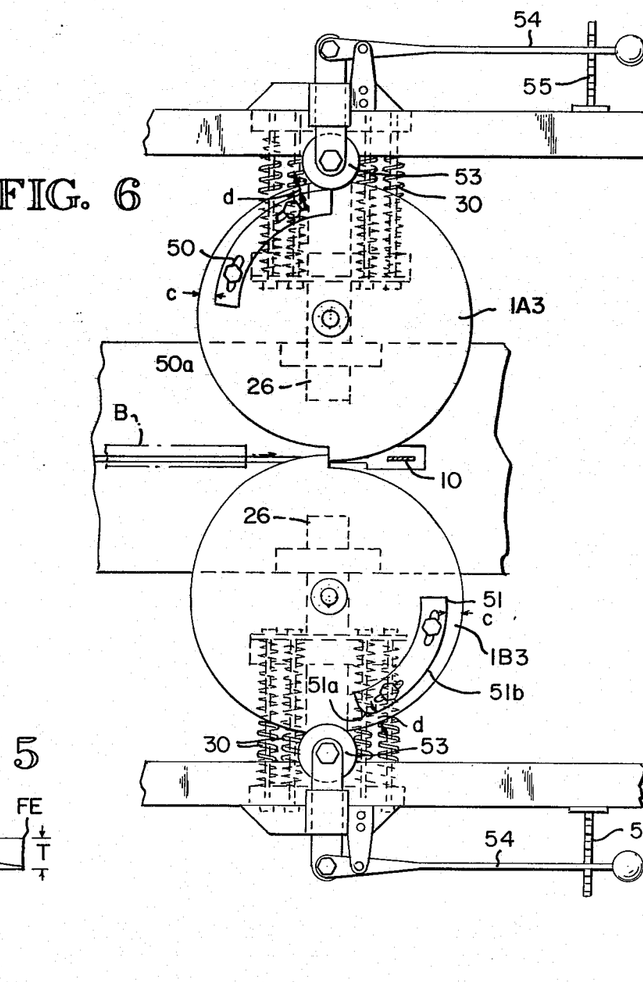
FIG. 6 is a fragmentary horizontal section of two of the discs shown in FIG. 1.

The upper and lower discs 1A3, 5A3 and 1B3, 5B3 are each provided with respective lateral stops bore cam plates 50 and 51. Looking first at the cam plates 51 on discs 1B3 and 5B3, each cam plate has a smooth forward surface 51$a$ followed by an elongated cam surface 51$b$. The gap between the periphery 14 of the disc 1B3 and the forward edge of the cam surface 51$b$ is indicated by the dimension $d$. The gap between the periphery of the disc and the rearward edge of the cam surface 51*b* is indicated by the dimension *c*. As is readily apparent in FIG. 6, the gap between the cam surface and the periphery of the disc is smallest at the forward end as shown as *b* and gets progressively larger until it reaches a maximum gap at *c*. As a shake board B engages the peripheral surface of disc 1B3, the springs 30 will allow the disc to move downwardly as shown in FIG. 6 or to the right as shown as in FIG. 1 until the cam surface 51*b* is engaged by a cam roller 53. The cam roller is adjustably mounted by a lever mechanism 54 which is seated in a selected detent of the row 55. Thus the cam surface 51 will control the position of disc 1B3 rather than the spring 30. In this way the forward edge of a board as it reaches the saw blade 10 will be positively positioned by the cam roller 53 so that the right side R of the board is spaced a desired distance laterally of the blade 10. This enables the saw blade to always enter the forward edge of the board at a desired spacing from the right surface R to get maximum thickness on the butt end of the forward edge of the board. Likewise the disc 1A3 has its cam plate 50 positioned to be engaged by a similar roller 53 which is also adjustably mounted by a linkage 54 in a detent 55. The cam plate 51 also has a cam surface 50B and a smooth entry cam surface 50A. Since disc 1A3 is rotating counterclockwise, the entry surface 50A will first be engaged by the roller 53 rolling onto the cam surface 50A. As is best shown in FIG. 6 the gap *c* becomes progressively smaller than the gap *d* such that the shake board as it finally leaves the saw blade 10 will be positively positioned with its left side 1 spaced a desired distance from the saw blade. This assures that the butt end of the rear end of the board is also as a maximum thickness.

In actual practice the discs are initially set for a 6/8 inch thick board. This board is manually advanced through the discs until the forward end FE engages the blade at the desired feather edge. The bolts 71 are then tightened to hold the discs relative to the bandsaw blade. With a ⅛ inch clearance between discs a nominal 6/8 inch thick board will cause both opposed sets of discs to spread 1/16 inch. The roller 53 is set to engage the cam 51 upon 1/16 inch deflection so that the board is permitted to shift to the right only 1/6 inch as it engages the blade. This will put a feather tip (0–⅛ inch) on the tip end of the shake at FE and obtain a maximum thickness on the butt of the adjacent shake at board end FE. For boards less than 6/8 inch thickness the cam 51 may not come into engagement with roller 53.

It should be noted that the faster decrease in decline of the cam plate 51 from the periphery of the disc 1B3 allows the springs to take over control of the position of the shake before the cam plate has completely passed the roller 53.

Figure 7A:
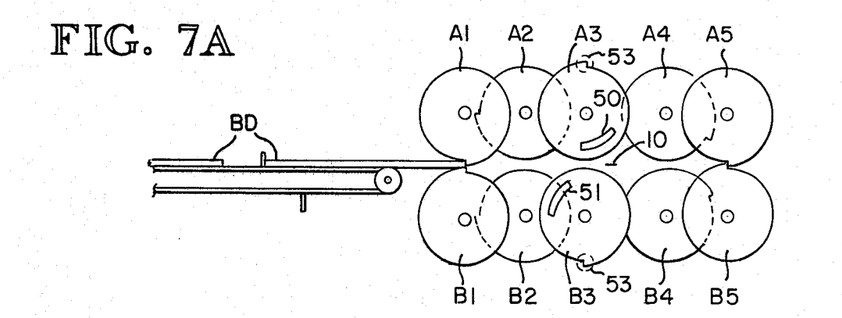
FIGS. 7A–7H are operational schematics illustrating advancement and skewing of a shake board as it is moved passed the cutting blade.
Figure 7B:
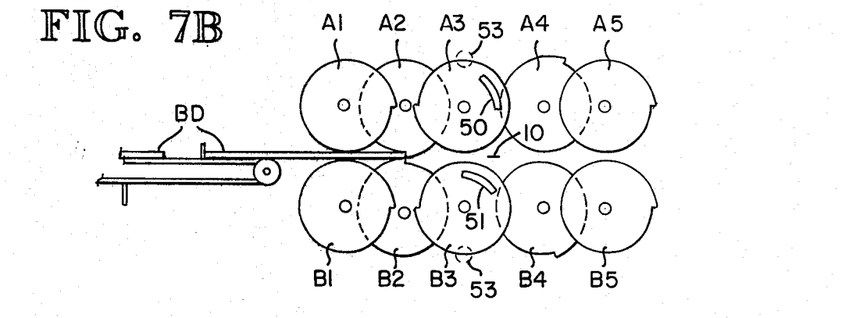

As a board approaches the first set of discs A1 and B1 it is engaged in the nip between the discs and spreads the discs against the force of the springs 30. The perimeter of the discs is approximately 29 inches such that a total revolution of the discs will advance the normal 24 inch board in one revolution. The springs 30 cause the discs to grip the side surfaces of the board, advancing it. When the discs have progressed 6 inches in revolution, the board is engaged in the nip between the next set of discs A2, B2. In this regard, discs A2, B2 are spaced six inches from discs A1, B1, discs A3, B3 are spaced six inches from the center of discs A2, B2, discs A5, B5 are spaced six inches from the center of discs A4, B4 but the centers of discs A4, B4 are spaced eight inches from the centers of discs A3, B3 to allow the greatest radius of discs A4, B4 to pass the blade 10 should it be deflected laterally or rearwardly under the load of cutting. As the board is moved by discs A1, B1 it initially is merely advanced during the constant radius portion of the discs and then begins to be shifted laterally. As the board is advanced 6 inches, it will be shifted laterally one-quarter of the shift that will occur throughout the machine. The forward end FE of the board meanwhile will have engaged the nip of the discs A2, B2 and will be realigned into the cutting plane CP by the springs 30. Thus, at this point the board will not only have been shifted laterally, but the forward end will have been realigned along the cutting plane so that the rear end of the board becomes skewed as best shown in FIG. 7B.

Figure 7C:
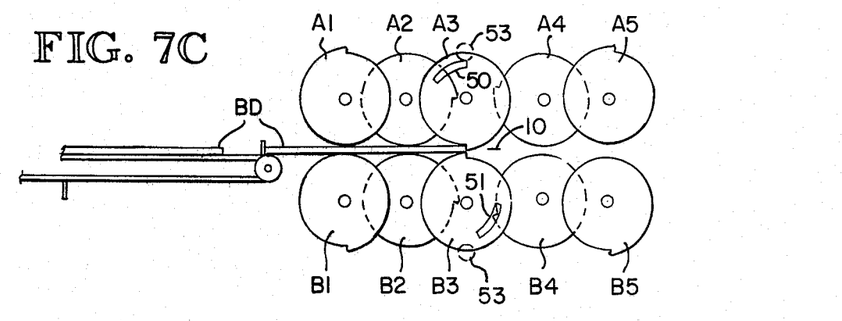
Figure 7D:
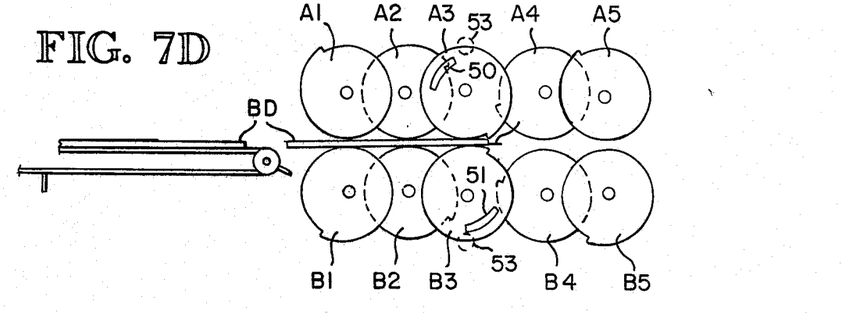
Figure 7E:
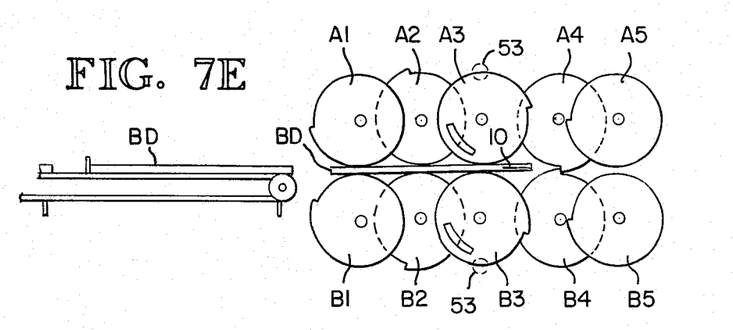

In 7C it can be seen that the board has now been advanced to the nip between discs A3 and B3. Discs A2 and B2 will have shifted the board laterally through a quarter of its width while discs A1, B1 will now have shifted a portion of the board engaged thereby one-half of its thickness. The forward end FE of the board will have become realigned on the cutting plane. As the board is advanced by the discs A3, B3 the first 2½ inches of advancement is along constant radius of the disc B3 and then the position of the disc for boards over the nominal ¾ inch thickness is controlled by the cam surface 51*b* in engagement with cam roller 53. This moves the board positively toward disc A3 in the case of overly thick boards so that the cutting blade enters the forward end of the board at a desired location which will be approximately at the surface R of the board as shown in FIG. 5. Since the curvature of the cam surface 51*b* diminishes more rapidly than the peripheral surface of the disc B3, the advancement of the board by the discs A3 and B3 will soon allow the cam surface to leave the cam roller so that the springs 30 will allow the board to be shifted more towards the disc B3. This is shown in the more rapid curvature of the diagonal cutting line in FIG. 5. Since at this time, the shake is skewed three-quarters of its thickness at its point of contact between discs A1, B1, its rear end RE will have been shifted one full thickness so that cutting continues along a diagonal as shown in FIG. 5.

Figure 7F:
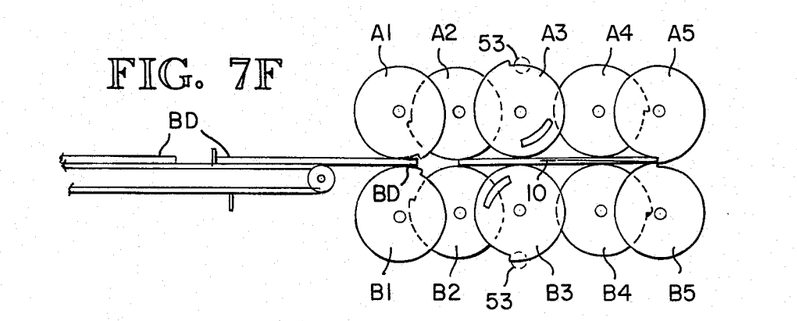
Figure 7G:
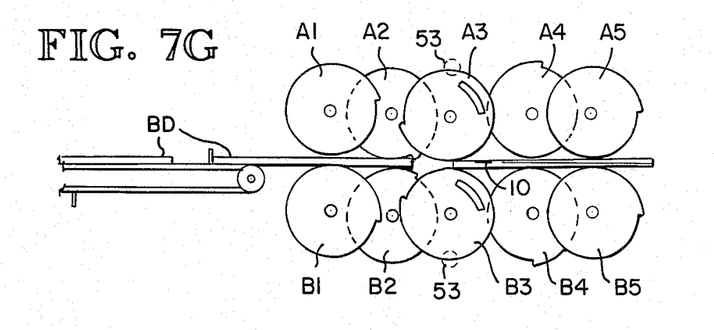

In FIG. 7F discs A4 and B4 have engaged a board and have advanced it into the nip of disc A5, B5. In FIG. 7G, the cam 50 on disc 1A3 has been positioned in alignment with a cam roller 53 but because of the more rapidly increasing taper of the surface 50*b* over that of the peripheral surface of the disc 1A3 in engagement with the board, the cam roller 53 will not have engaged the cam surface 50*b*. With further rotation, however, the cam surface 50*b* will soon engage the roller 53 for boards over ¾ inch thick positively shifting the rear end RE of the board toward disc 1B4 so that the cutting blade leaves along a desired location close to the side surface L as shown in FIG. 5. Thus a feather tip and thick butt are made in the two shakes at rear board end RE.

Figure 7H:
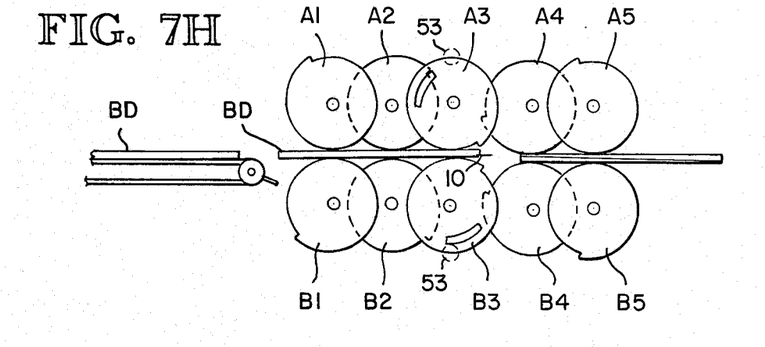

As best shown in FIG. 7H the board as it leaves the cutting blade is still held forwardly or downstream of the cutting blade so that it is always held in a stable controlled position during the entire cutting operation.

The discs are 29 inches in circumference. Only 24 inches of the periphery has a radius change and in that 24 inches the radius change is ⅝ of an inch.

It should be noted that the spring 30 on discs A3, B3 are doubled and are approximately four times (40 lbs. per inch) as powerful as the springs on discs on A1, B1 (10 lbs. per inch) so that the board is held softly at its rear end but held firmly at discs A3, B3 as the board passes through the blade for increased stability under the cutting load. In addition the stronger spring force also overcomes the weaker springs on the other discs to control the position of the board close to the blade even though the board may have a very large twist or curvature at its forward or rearward end.

While the preferred embodiments of the invention have been illustrated and described, it should be understood that variations will be apparent to one skilled in the art. Accordingly, the invention is not to be limited to the specific embodiment illustrated in the drawing.

The embodiments of the invention in which a particular property or provilege is claimed are defined as follows:

1. A method of sawing shakes from blanks to maximize yield comprising:
    advancing a blank having first and second opposite side faces endwise along a path;
    moving a cutting blade through a cutting plane lying in said path;
    skewing the blank laterally as it moves along the path prior to passing the cutting plane, said skewing step including sequentially engaging the blank at its forward end and then moving the forward end along the path while progressively moving the blank rearwardly of the forward end laterally increasingly greater distances so that the blank is moved simultaneously at least at two locations along its length; and
    continuing to move the skewed blank through the cutting plane to sever the blank into two separate shakes.

2. The method of claim 1, said step of sequentially engaging the blank at its forward end including initially positioning the forward end laterally to align the forward edge of a first side face of the blank in the cutting plane.

3. The method of claim 1, said skewing step including sequentially engaging the rearward end of the blank and progressively moving the rearward end laterally said increasingly greater distances, and including finally positioning the rearward end laterally to align the rearward edge of an opposite second side face of the blank in the cutting plane.

4. The method of claim 2, said skewing step including sequentially engaging the rearward end of the blank and progressively moving the rearward end laterally said increasingly greater distances, and including finally positioning the rearward end laterally to align the rearward edge of an opposite second side face of the blank in the cutting plane.

5. The method of claim 1, said step of skewing including resiliently varying said progressive lateral movements at different locations along said side faces spaced along the width of the side faces so that the blank can be skewed also in a lengthwise plane which intersects said cutting plane at an angle as the blank passes the cutting blade to accommodate irregularities in the shape of the blank.

6. The method of claim 4, said step of skewing including resiliently varying said progressive lateral movements at different locations along said side faces spaced along the width of the side faces so that the blank can be skewed also in a lengthwise plane which intersects said cutting plane at an angle as the blank passes the cutting blade to accommodate irregularities in the shape of the blank.

7. The method of claim 1, said step of skewing the blank laterally including applying lateral moving forces on the blank, and including the step of initially adjusting the position of application of all said laterally moving forces laterally of the cutting plane to accommodate variations in cutting characteristics of a particular cutting blade.

8. The method of claim 1, wherein said skewing step continues downstream of the cutting blade so that the blank is supported forwardly and rearwardly of the blade during cutting.

9. Apparatus for sawing shakes lengthwise from a blank having rearward and forward ends and opposite first and second side faces, with a bandsaw blade passing through a cutting plane, comprising:
    first means on opposite sides of the cutting plane for engaging the opposite side faces of the blank and positioning a first side face progressively latterally of the cutting plane while simultaneously advancing the blank lengthwise toward the blade;
    second means spaced close to the blade along the cutting plane and on opposite sides thereof for engaging the opposite side faces of the blank and positioning the forward edge of the first side face in alignment with the saw blade and then simultaneously and progressively advancing the blank lengthwise toward the blade and skewed laterally of the cutting plane;
    means for simultaneously operating both said first and second means so that the blank is moved simultaneously forward toward the blade and skewed laterally of the blade whereby the blade cuts through the blank generally on a diagonal of the blank.

10. The apparatus of claim 9, said second means including adjustable stop means a short distance upstream of the saw blade in the direction of movement of the blank for limiting lateral movement of the blank forward edge so as to position the first side face forward edge in alignment with the blade.

11. The apparatus of claim 9, including means for skewing the blank about its own lengthwise axis for accommodating irregularities in the shape of the blank.

12. The apparatus of claim 9, said first and second means for engaging the opposite side faces of the blank including a plurality of opposed rows of discs spaced along the said cutting plane ahead of and after the bandsaw blade, each said row including a plurality of discs spaced along a common axis, each said disc having a peripheral surface a portion of which has a progressively decreasing diameter, means for rotating a first set of discs along one side of said cutting in a direction which advances the blank and which progressively increases radius of the discs as the discs engage the blank for skewing the blank laterally away from the said one side of the cutting plane, means for rotating a second set of discs along the opposite side of said cutting plane synchronously with said first set of discs and in a direction to advance the blank while progressively decreasing the radius of the discs as the discs engage the side of the blank for skewing the blank toward the second set of discs.

13. The apparatus of claim 12, including biasing means for pressing the first and second means against the blank, and further including stop means on two opposed rows of discs for positively positioning respectively the forward and then the rearward end of the opposite side face of the blank into alignment with the cutting blade.

14. The apparatus of claim 13, said stop means each being mounted on and having a radius which decreases faster and increases faster than the progressively decreasing disc radius and increasing radius discs of the shake engaging discs respectively.

15. The apparatus of claim 14, wherein all said discs can be shifted laterally to compensate for cutting characteristics of the saw blade.

16. The apparatus of claim 9, including means for shifting laterally each of said first and second blank engaging means for compensating for cutting characteristics of the saw blade.

17. Apparatus for advancing and simultaneously skewing a shake blank having forward and rearward ends and opposite first and second side faces as the blank is passed through a bandsaw blade lying in a cutting plane, comprising:
   first disc means lying on one side of said cutting plane and having a progressively increasing diameter in its direction of rotation;
   second disc means on the opposite side of said cutting plane and having a progressively decreasing diameter in its direction of rotation; and
   means for rotating the first and second disc means for engaging a blank therebetween and advancing the blank while simultaneously shifting the blank laterally.

18. The apparatus of claim 19, said first and second disc means each including at least two rows of discs for engaging the blank simultaneously at two points along its length on both sides of the blank so that the rearward end of the blank is shifted laterally further than the forward end to skew the blank as it is advanced past the blade.

19. The apparatus of claim 18, including biasing means to press the discs on opposite sides of the cutting plane toward each other for pressing the blank therebetween.

20. The apparatus of claim 18, including stop means carried along a portion of the decreasing radius of two opposed discs adjacent the saw blade to positively stop lateral shifting of the forward end of the blank so that one side face is aligned with the blade and then positively stop lateral movement of the opposite side face at the rearward end of the blank so that the opposite side face rearward end is aligned with the blade.

21. The apparatus of claim 20, said stop means each having radius which respectively progressively increases and progressively decreases at a faster rate than the perimeter radius of the disc upon which the respective stop means is mounted.

22. A method of sawing shakes from blanks to maximize yield, comprising:
   advancing a blank endwise along a path;
   moving an endless bandsaw blade in a cutting plane in said path at a cutting station,
   continuously engaging both sides of the blank adjacent and upstream from the cutting blade and a cutting station, continuously shifting the blank laterally at the cutting station in response to the variations in thickness of the blank until the desired cutting plane within the blank is achieved dependent upon the thickness of the blank so that the cutting plane at each end of the blank is determined solely by the thickness of the respective end at the time of cutting.

23. The method of claim 22, including the step of skewing the upstream rearward end of the blank laterally as the blank is positioned at the cutting station so that the cutting plane is along a general diagonal line at the time of cutting.

* * * * *